Oct. 27, 1964     F. J. HOOVEN     3,154,323
VIBRATION ISOLATION WHEEL SUSPENSION FOR MOTOR VEHICLE
HAVING SIDE THRUST STEER CHARACTERISTICS
Filed Oct. 2, 1961
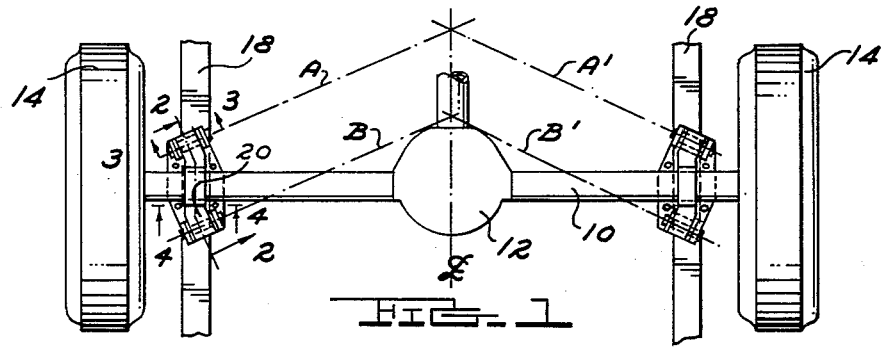
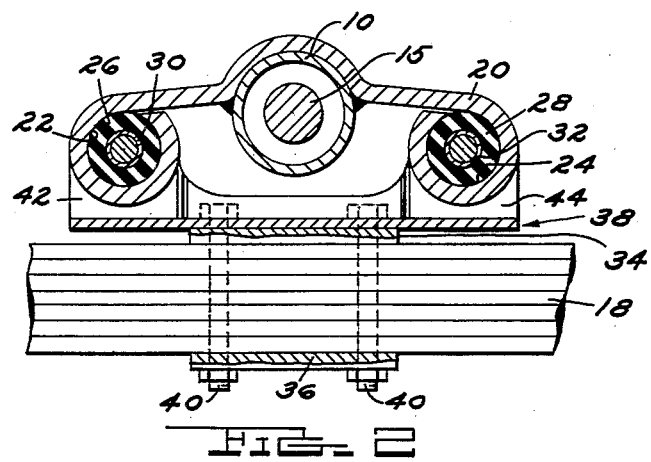
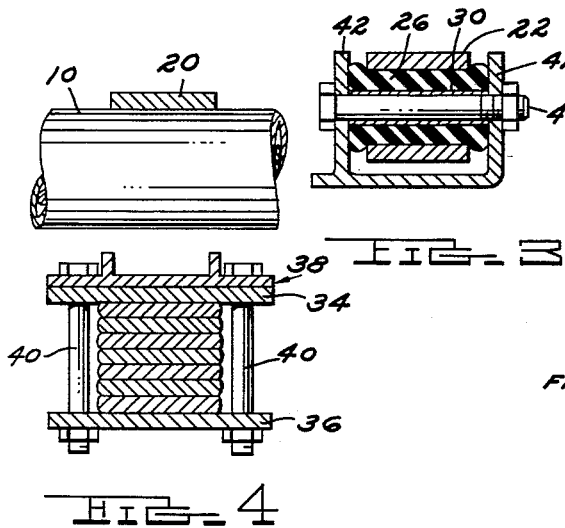
FREDERICK J. HOOVEN
INVENTOR.
BY John R. Faulkner
Clifford L. Sadler
ATTORNEYS United States Patent Office 3,154,323
Patented Oct. 27, 1964

3,154,323
VIBRATION ISOLATION WHEEL SUSPENSION FOR MOTOR VEHICLE HAVING SIDE THRUST STEER CHARACTERISTICS
Frederick J. Hooven, Bloomfield Hills, Mich., assignor to Ford Motor Company, Dearborn, Mich., a corporation of Delaware
Filed Oct. 2, 1961, Ser. No. 142,122
10 Claims. (Cl. 280—124)

The present invention relates to vehicle suspension systems and more particularly to means for securing an axle housing to a leaf type suspension spring, a trailing arm or similar axle positioning device.

In a motor vehicle, the transmission of noise and vibration of the road and drive line from the rear axle into the passenger compartment may be greatly reduced by the use of a compliant connection between the axle and the means employed to mount and locate the axle relative to the vehicle's body. A compliant device permits the wheel to recede slightly in a horizontal direction upon impact with a road obstacle. When a vehicle wheel strikes a small object in the road, such as the tar expansion strip used in concrete pavement, both vertical and horizontal forces are created. In a conventional suspension system, the main suspension springs permit the resilient absorption of the vertical forces. By employing a compliant connection, limited fore and aft flexibility is introduced so that the wheel and axle may recede or give under impact from the horizontal force component.

One means of introducing compliance in a rear suspension system calls for the use of cylindrical rubber bushings interposed between axle and leaf spring brackets. The rubber bushings are ordinarily installed in pairs, one immediately before and the other immediately aft the axle with the axes of the bushings parallel to the axle. The spacing and radial flexibility of the bushings is so proportioned as to limit the amount of "wind-up" deflection of the axle when subjected to the torques of driving and braking.

The cylindrical bushings most commonly employed have greater compliance or flexibility in an axial direction than in a radial direction. This fact permits the axle to move slightly laterally with respect to the vehicle and such lateral movement, while contributing to the quietness and smoothness of the ride, has the undesirable affect of causing the vehicle to lose some precision of steering control by the introduction of a slight tendency to steering wander.

It has been found that the undesirable steering characteristics that result from the above-mentioned axial resiliency of the bushings can be eliminated by introducing a steering deflection of the axle to accompany any lateral deflection of the isolating bushings.

Therefore, in accordance with the present invention, it is an object to provide a leaf spring to axle housing connection in which fore and aft compliant bushings are interposed between the axle housing and the leaf spring. More specifically, the axes of the bushings lie in a horizontal plane and are inclined so that they intersect a vertical plane containing the longitudinal centerline of the vehicle at a point forward of the axle centerline or axis.

In a vehicle having compliant bushings arranged in accordance with the present invention, a force tending to push the car to the left, such as the centrifugal force occurring upon a turn to the right will result in a shifting of the leaf spring laterally to the left relative to the axle. Because the compliant bushings are canted, this lateral movement will also cause some relative movement in a longitudinal direction. The end result of the lateral movement will be to cause the left-hand end of the axle to move forwardly relative to the body and the right-hand end to move rearwardly. By forcing the axle ends to move longitudinally in opposite directions, a steering deflection that will tend to move the vehicle in a left-hand direction will be created. Such a deflection is known as understeer and although the axle canting is of a small degree, it adds considerably to the overall directional stability of the vehicle.

It is one of the principal objects of the present invention, therefore, to provide a compliance suspension connection between the axle housing and leaf spring that will introduce a slight canting of the axle when side forces are encountered between the tire and the road. In the preferred embodiment, when the vehicle encounters side forces such as those occurring from wind thrust, the axle tends to move sideways. Since the compliant bushings have lateral flexibility and are inclined as described above the effect is to slightly cant the axle in the direction of understeer.

Further objects and advantages of the present invention will be more fully comprehended from the following discussion and the accompanying drawings, in which:

FIGURE 1 is a top plan view of the presently preferred embodiment of this invention incorporated in a rear suspension system of a motor vehicle;

FIGURE 2 is a sectional view taken along section lines 2—2 of FIGURE 1;

FIGURE 3 is a sectional view taken along section lines 3—3 of FIGURE 1; and,

FIGURE 4 is a sectional view taken along section lines 4—4 of FIGURE 1.

Referring now to the drawings, FIGURE 1 shows the rear suspension of a motor vehicle having an axle housing 10 with a differential gear unit 12 situated at its midpoint. A pair of road wheels 14 are drivingly connected to an axle 15 contained within the housing 10. A drive shaft 16 transmits power to the differential 12 which in turn distributes the driving torque through the left and right halves of the axle 15 to the wheels 14.

Means are provided for connecting the axle housing 10 to the vehicle body. Such means include a pair of longitudinally extending leaf springs 18 that have their front and rear ends secured to the vehicle body in a conventional fashion. The leaf springs are in turn secured to the axle housing 10 by means of a flexible construction which permits slight relative movement adapted to absorb road shocks.

The axle housing 10 has a mounting bracket 20 welded thereto. The bracket 20 is a strip of sheet metal that extends in a generally longitudinal direction and has its fore and aft ends curled over to form bushing eyes 22 and 24. The eyes 22 and 24 have parallel axes that are inclined to intersect a vertical plane through the longitudinal centerline of the vehicle ahead of the axis of the axle 15. Situated within the fore and aft eyes 22, 24 are rubber bushings 26 and 28. The rubber bushings 22, 24 are cylindrical in configuration and each have a piece of cylindrical tubing 30, 32 situated in the center thereof.

Each of the leaf springs 18 comprises a laminated series of single spring metal leaves that are held together by upper and lower spring clamps 34 and 36. Positioned above the upper spring clamp 34 is an attaching bracket 38. The bracket 38 and clamps 34, 36 are secured about the laminated leaf spring 18 by a series of machine bolts 40.

The spring bracket 38 has a pair of upstanding flanges situated at its forward end identified by the reference numeral 42 and a pair of flanges 44 situated at its rearward end. The forward flanges 42 are positioned against the ends of the bushing 26 and in a similar fashion the flanges 44 are positioned against the ends of the bushing 28. Apertures are provided in the flanges 42 in alignment with the tubing 30 through which a bolt 46 passes. This construction connects the axle bracket 20 and the spring bracket 38 and is best seen in FIGURE 2. The construction at the rear eye 24 is similar.

The bolt 46, tubing 30, bushing 26 and eye 20 are all concentric and have a common axis A which, as seen in FIGURE 1, is inclined to the axis of the axle housing 10 so as to intersect a vertical plane containing centerline of the vehicle. The axis of the rear bushing 28 is indicated by the reference letter B and is parallel to the axis A.

The axle housing to leaf spring connection for the right-hand side of the vehicle is symmetrical to the construction just described. In this case the forward bushing has an axis A' which intersects the axis A and the plane of the centerline at a common point. A similar arrangement exists for axes B and B'.

During the operation of a vehicle having the suspension illustrated in the drawings, when one of the wheels 14 strikes an object such as a tar strip used in concrete pavement horizontal force components are created that will cause the rubber bushings 26 and 28 to compress in a radial direction and permit the vehicle's wheel to give or recede slightly in a horizontal direction. Such action absorbs the horizontal force and improves riding characteristics by eliminating what is known as "ride harshness."

The bushings 26 and 28 also have flexibility in an axial direction as well as in a radial direction. Therefore, if the suspension system of FIGURE 1 comes under the influence of a side force such as wind thrust or centrifugal force, there will be a lateral displacement between the axial housing 10 and the leaf spring 18. Such lateral displacement will occur along the inclined paths of the axes A, B, A' and B'. The canting of the axle resulting therefrom will produce an understeer effect for improved ride and handling.

The foregoing description presents the presently preferred embodiment of this invention. While the above discussion is directed to a construction interconnecting a live axle with longitudinally extending leaf springs, the invention and related description is also applicable to other suspension means for positioning a vehicle axle such as a rear suspension system employing trailing arms connected to the axle housing for location purposes. Other alterations or modifications may occur to those skilled in the art which will come within the scope and spirit of the following claims.

I claim:

1. A vehicle having a body and an unsprung axle, elongated suspension means interconnecting said axle and said body, compliance means connecting said axle and said suspension means, said compliance means including a plurality of rubber bushings interposed between said suspension means and said axle, said bushings being arranged with their axes at an acute angle to said elongated suspension means and to the longitudinal axis of said body, said compliance means being adapted to impart a steering deflection to said axle when said vehicle body is subjected to a lateral force.

2. The combination of claim 1 wherein said suspension means includes a pair of longitudinally extending leaf springs, each of said leaf springs being connected at its ends to said vehicle body.

3. A vehicle having a body and an axle, a pair of longitudinally extending elongated suspension means interconnecting said body and said axle, each of said means being secured to said axle by resilient compliant means having an axis of greatest relative deflection located in a horizontal plane and inclined with respect to the axis of said axle in a direction to intersect a vertical plane containing the longitudinal centerline of said vehicle at an acute angle, said compliant means being adapted to cause said axle to cant relative to said body in response to a lateral force between said axle and said body.

4. The combination of claim 3 wherein said pair of suspension means comprises a pair of longitudinally extending leaf springs, each of said leaf springs being connected at its ends to said vehicle body.

5. A vehicle having a body and an axle, a pair of longitudinally extending elongated suspension means interconnecting said body and said axle, each of said means being secured to said axle by a plurality of resilient compliant members having an axis of deflection located in a horizontal plane and inclined with respect to the axis of said axle in a direction to intersect a vertical plane containing the longitudinal centerline of said vehicle at a point between the axis of said axle and the center of gravity of the vehicle, said compliant members being adapted and arranged to cause said axle to cant relative to said body in response to a lateral force between said axle and said body.

6. The combination of claim 5 wherein said pair of suspension means comprises a pair of longitudinally extending leaf springs, each of said leaf springs being connected at its ends to said vehicle body.

7. A vehicle having a body and an unsprung axle, a pair of longitudinally extending suspension means interconnecting said axle and said body, compliance means connecting said axle and said suspension means, said compliance means including a plurality of cylindrical rubber bushings interposed between said suspension means and said axle, said bushings having their axes intersecting.

8. The combination of claim 7 wherein said pair of suspension means comprises a pair of longitudinally extending leaf springs, each of said leaf springs being connected at its ends to said vehicle body.

9. A vehicle having a body and an axle constituting an unsprung component, a pair of suspension means interconnecting said body and said axle, said means being adapted to cause said axle to move laterally and longitudinally relative to said body in response to a lateral force between said body and said axle, each of said means including a plurality of cylindrical bushings, said bushings having an axis of deflection located in a horizontal plane and inclined to intersect a vertical plane containing the longitudinal center line of said vehicle at an acute angle.

10. The combination of claim 9 wherein said point of intersection of said axis with said vertical plane is situated forwardly of said unsprung component.

References Cited in the file of this patent

UNITED STATES PATENTS

| | | |
|---|---|---|
| 1,421,758 | Belden | July 4, 1922 |
| 2,708,134 | Sewelin | May 10, 1955 |

FOREIGN PATENTS

| | | |
|---|---|---|
| 1,133,911 | France | Nov. 26, 1956 |